United States Patent
Egashira et al.

(10) Patent No.: US 11,560,095 B2
(45) Date of Patent: Jan. 24, 2023

(54) DISPLAY CONTROL DEVICE FOR ELECTRONIC MIRROR, AND ELECTRONIC MIRROR SYSTEM INCLUDING THE SAME

(71) Applicants: DENSO CORPORATION, Kariya (JP); TOYOTA JIDOSHA KABUSHIKI KAISHA, Toyota (JP)

(72) Inventors: Akira Egashira, Kariya (JP); Yuki Yamagami, Kariya (JP); Kunihiro Sugihara, Nagakute (JP); Goro Asai, Toyota (JP); Tomoaki Iida, Okazaki (JP); Taichi Hasegawa, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/193,790

(22) Filed: Mar. 5, 2021

(65) Prior Publication Data
US 2021/0188177 A1 Jun. 24, 2021

Related U.S. Application Data

(63) Continuation of application No. PCT/JP2019/034973, filed on Sep. 5, 2019.

(30) Foreign Application Priority Data

Sep. 7, 2018 (JP) .............................. JP2018-168067

(51) Int. Cl.
 *B60R 1/12* (2006.01)
 *B60R 1/08* (2006.01)

(52) U.S. Cl.
 CPC .............. *B60R 1/1207* (2013.01); *B60R 1/08* (2013.01); *B60R 2001/1253* (2013.01); *B60R 2300/605* (2013.01); *B60R 2300/8046* (2013.01)

(58) Field of Classification Search
 CPC . B60R 1/1207; B60R 1/08; B60R 2001/1253; B60R 2300/605;
 (Continued)

(56) References Cited

U.S. PATENT DOCUMENTS

| 2008/0215232 | A1  | 9/2008 | Ikeda et al. |
| 2013/0002877 | A1* | 1/2013 | Miyoshi ................... B60R 1/00 348/148 |
| 2019/0217783 | A1  | 7/2019 | Hasegawa et al. |

FOREIGN PATENT DOCUMENTS

| EP | 2547104 A1 | 1/2013 |
| FR | 3038873 A1 | 1/2017 |

(Continued)

*Primary Examiner* — Sath V Perungavoor
*Assistant Examiner* — Tyler B Edwards
(74) *Attorney, Agent, or Firm* — Maschoff Brennan

(57) ABSTRACT

Provided is an input unit to which input signals are inputted, the input signals including signals indicating operating states of switches used for operating the electronic mirror and used for selecting a display mode from among the plurality of display modes to be displayed by the electronic mirror; a storage unit that together with prioritizing and storing each of a plurality of display modes in a hierarchical structure, stores mode setting conditions that are conditions for setting each display mode; a determination unit for determining whether or not the mode setting conditions are satisfied for each of the plurality of display modes based on the input signals; and a setting unit that, of the plurality of display modes, sets a display mode from among the display modes for which the mode setting conditions are satisfied, as a display mode to be displayed on the electronic mirror.

12 Claims, 7 Drawing Sheets

(58) Field of Classification Search
CPC ...... B60R 2300/8046; B60R 2300/306; B60R 2300/307; B60R 2300/70; B60R 2300/802; B60R 2300/8066; B60R 1/00
See application file for complete search history.

(56) References Cited

FOREIGN PATENT DOCUMENTS

| | | | | |
|---|---|---|---|---|
| JP | 2003-291729 A | 10/2003 | | |
| JP | 2005-231605 A | 9/2005 | | |
| JP | 2008-148059 A | 6/2006 | | |
| JP | 2007-81932 A | 3/2007 | | |
| JP | 2008-217314 A | 9/2008 | | |
| JP | 2011-193136 A | 9/2011 | | |
| JP | 2013-95280 A | 5/2013 | | |
| JP | 2017-24464 A | 2/2017 | | |
| JP | 2017-34430 A | 2/2017 | | |
| JP | 2017024464 A * | 2/2017 | ............... | B60R 1/00 |
| WO | 2015/098156 A1 | 7/2015 | | |
| WO | WO-2015098156 A1 * | 7/2015 | ............... | B60R 1/00 |
| WO | 2018/008631 A1 | 1/2018 | | |

* cited by examiner

FIG.3

| # | MODE NAME | MODE EXPLANATION |
|---|---|---|
| 1 | FIRST MAINTENANCE MODE | PROVIDES A FUNCTION OF CORRECTING CAMERA ROLL DEVIATION. |
| 2 | SECOND MAINTENANCE MODE | PROVIDES A FUNCTION OF CORRECTING DEVIATION OF REAR GUIDE LINES. |
| 3 | REVERSE DISPLAY MODE | PROVIDES A REAR VIEW IN WIDE ANGLE DISPLAY DURING REVERSE DRIVING. |
| 4 | WIDE FIELD DISPLAY MODE | PROVIDES A REAR VIEW BASED ON DRIVER OPERATION. |
| 5 | DOOR OPEN DISPLAY MODE | PERFORMS A WIDE ANGLE DISPLAY WHEN A DOOR IS OPENED. |
| 6 | LEFT/RIGHT TURN MODE | PROVIDES A REAR VIEW FOR SUPPORTING LEFT OR RIGHT TURN DRIVING WHEN MAKING A LEFT OR RIGHT TURN AT AN INTERSECTION. |
| 7 | NORMAL DISPLAY MODE | PROVIDES A REAR VIEW EQUIVALENT TO AN OPTICAL MIRROR DURING NORMAL DRIVING. |

DISPLAY CONTROL DEVICE FOR ELECTRONIC MIRROR, AND ELECTRONIC MIRROR SYSTEM INCLUDING THE SAME

CROSS REFERENCE TO RELATED APPLICATION

This application is the U.S. bypass application of International Application No. PCT/JP2019/034973 filed on Sep. 5, 2019, which designated the U.S. and claims priority to Japanese Patent Application No. 2018-168067, filed Sep. 7, 2018, the contents of which are incorporated herein by reference.

BACKGROUND

Technical Field

The present disclosure relates to a display control device for an electronic mirror that controls the display of an electronic mirror that displays video images of around a vehicle, and an electronic mirror system including the display control device.

Description of the Related Art

Conventionally, a display control device for an electronic mirror has been proposed in which a camera captures video images of an area surrounding a vehicle, and switches the video image range between displaying the video images as video images within a range equivalent to an optical mirror, displaying video images in a wider range, or the like.

SUMMARY

The display control device for electronic mirror according to one aspect of the present disclosure is a display control device that captures video images of the rear of a vehicle, and performs a display on an electronic mirror in a display mode selected from among a plurality of display modes. The display control device includes: an input unit; a storage unit; a determination unit; and a setting unit.

BRIEF DESCRIPTION OF THE DRAWINGS

In the accompanying drawings;

FIG. 3 is a table illustrating various display modes performed by the display control device;

DETAILED DESCRIPTION OF THE PREFERRED EMBODIMENTS

Figure 1:
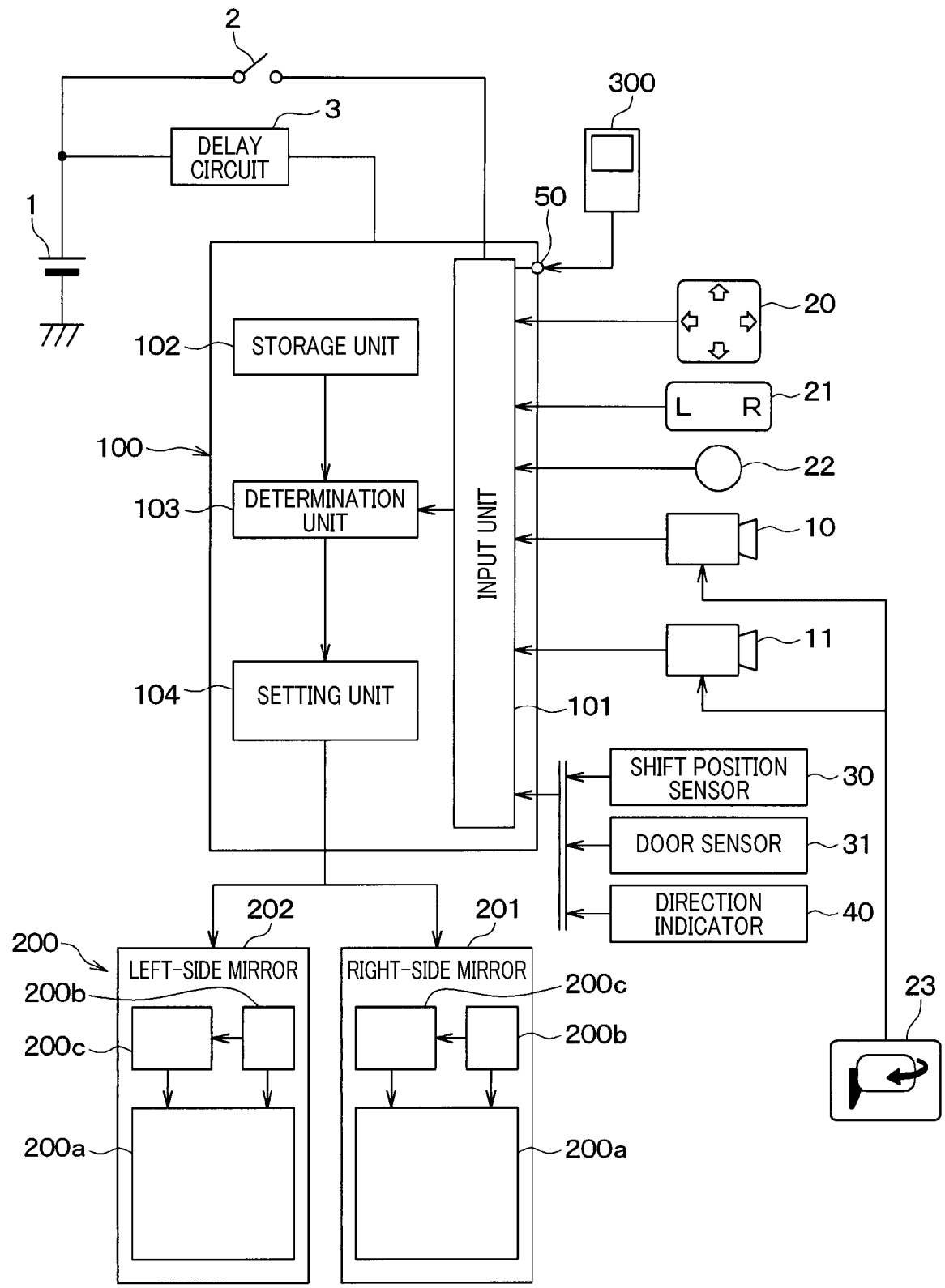
FIG. 1 is a diagram illustrating a block configuration of an electronic mirror system according to a first embodiment.

As a conventional art described above, for example, JP 2017-34430 A discloses a configuration in which the display range of an image on a display device of an electronic mirror is adjusted by changing a cut-out angle of view according to the steering angle.

It is desired that various display modes may be set according to the situation in the electronic mirror. On the other hand, the selection of the display mode by the electronic mirror is generally performed by diverting the buttons of an existing optical mirror, so it is necessary to realize the state transition according to the situation with a small number of switches.

In order to realize this, for example, in a case where a certain mode is set for each of a plurality of modes, it is feasible to design all patterns for determining what kind of switch operation is performed and which mode is transitioned to next.

However, since it is necessary to design a pattern for transitioning to another mode for each of a plurality of modes, the number of conditions of a pattern necessary to be examined is the square of the number of modes, which increases the design man-hours. For this reason, there is a concern that quality assurance problems may occur, such as an increase in management costs and an inability to select a mode due to unexpected conditions.

Hereinafter, embodiments of the present disclosure will be described with reference to the drawings. Note that in each of the following embodiments, parts that are the same or equivalent to each other will be described using the same reference numerals.

First Embodiment

The electronic mirror system mounted in a vehicle according to a first embodiment and the display control device provided therein will be described. The electronic mirror system is a system including an electronic mirror and various configurations for performing control of the display by the electronic mirror, and the display control device constitutes an electronic control device for controlling the display thereof. Hereinafter, the configuration of the electronic mirror system including the display control device 100, the electronic mirror 200, and the like will be described with reference to FIGS. 1 and 2.

Figure 2:
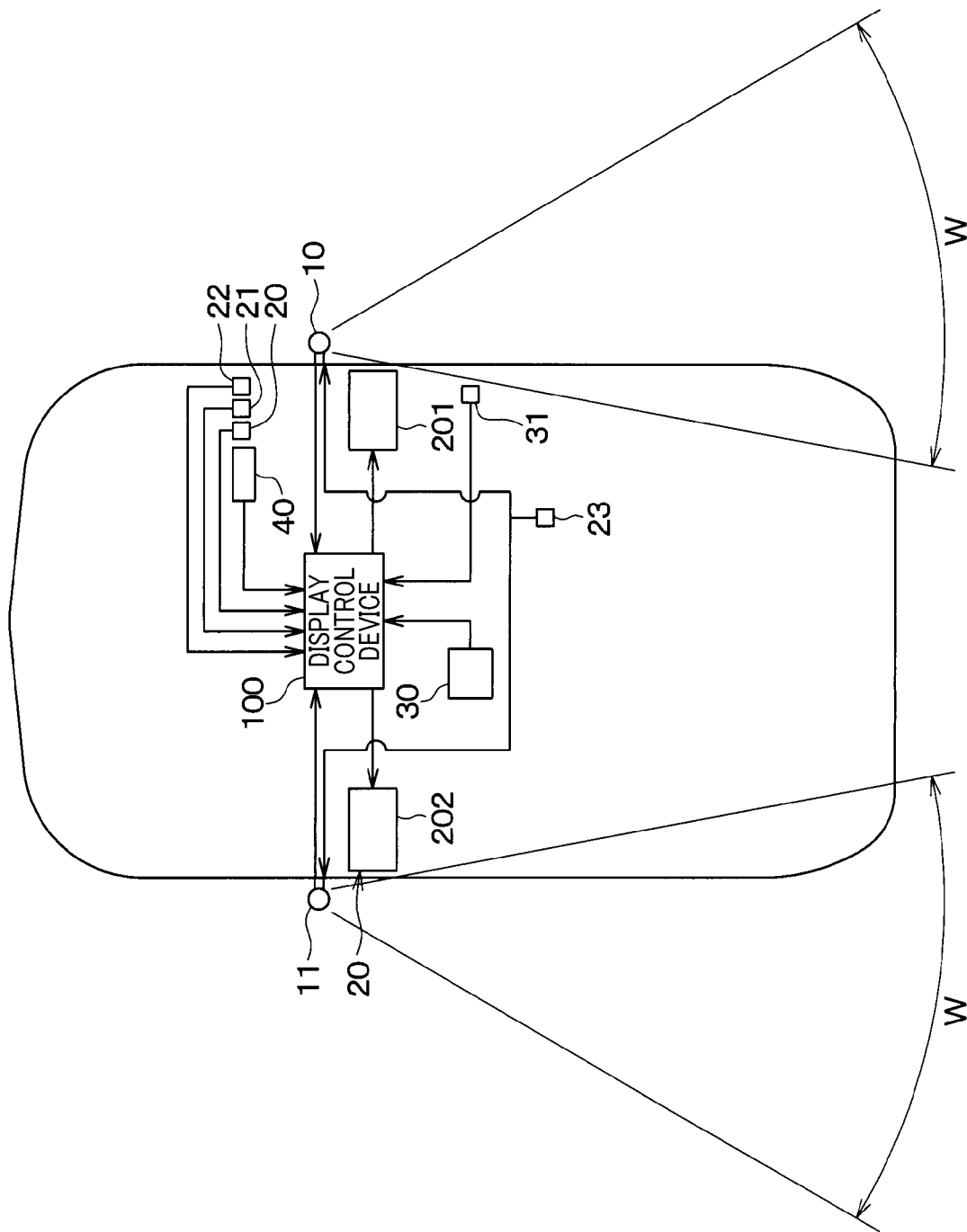
FIG. 2 is a diagram illustrating a block configuration of the electronic mirror system illustrated in FIG. 1 in a state of being mounted in a vehicle.

As illustrated in FIGS. 1 and 2, in addition to the display control device 100 and the electronic mirror 200, the electronic mirror system includes cameras 10, 11, various switches 20 to 23, a shift position sensor 30, a door sensor 31, a direction indicator 40, and the like. Moreover, in the electronic mirror system, it is possible to set the display mode by using an external terminal 300.

The display control device 100 controls the display on the electronic mirror 200 and causes an image to be displayed in a specified display mode, and the configuration includes a well-known microcomputer equipped with a CPU, ROM, RAM, I/O, timer, and the like. The display control device 100 is driven based on the power supplied from a power supply 1 that uses a constant voltage source such as a battery or a +B power supply in the vehicle as the power supply 1. Then, the display control device 100 performs control of the display of the electronic mirror 200 by executing various processes according to a program stored in a memory corresponding to a non-transitional substantive recording medium such as a ROM, a RAM, or the like.

When an ignition switch (hereinafter referred to as IG) 2 is turned ON, the display control device 100 is driven by receiving the power supplied from the power supply 1; however, here, even when the IG 2 is turned OFF, the display control device 100 is designed to be driven for a specified period of time, 7 minutes for example. In the case of the present embodiment, the display control device 100 is able to receive power supplied from the power supply 1 and also via a delay circuit 3. Therefore, the display control device 100 continues to be driven for a specified period by receiving the power supplied via the delay circuit 3 even after the IG 2 is turned OFF, and power supplied from the power supply 1 may not be received directly.

The display control device 100 is configured to include an input unit 101, a storage unit 102, a determination unit 103, a setting unit 104, and the like.

In addition to the image data of the cameras 10, 11, the input unit 101 inputs various input signals used for selecting the display mode of the electronic mirror 200. For example, the input unit 101 inputs an ON/OFF signal of the IG 2 and a signal indicating an operating state of various switches 20 to 22 for controlling the electronic mirror 200 as input signals. In addition, the input unit 101 also inputs detection signals of a shift position sensor 30 and the door sensor 31, and a signal indicating the operating state of the direction indicator 40 as input signals. Furthermore, the input unit 101 has an input terminal 50, and is such that input signals indicating instruction commands from an external terminal 300 such as a tester or the like are also inputted.

The storage unit 102 is configured by a memory such as a ROM or the like, and as will be described later, stores mode setting conditions and mode release conditions of various display modes, and data having a hierarchical structure by giving priority to each display mode. The determination unit 103 is a unit that determines whether or not the mode setting conditions or the mode release conditions are satisfied for each of the plurality of display modes based on the input signal inputted by the input unit 101. Moreover, of the display modes among the plurality of display modes that satisfy the mode setting conditions, a setting unit 104 sets the display mode having the highest priority as the display mode to be displayed on the electronic mirror 200. The display control device 100, by each of the functional units, performs setting of the display mode according to the situation, and sends the image data after image processing has been performed according to the set display mode to the electronic mirror 200. As a result, the electronic mirror 200 performs an image display according to the display mode. Note that details of the display mode settings, the priority, and the like when the electronic mirror 200 performs a display will be described later.

The cameras 10, 11 capture video images to be projected on the electronic mirror 200, and capture the state around the vehicle, which in this case is the state behind the vehicle. The right rear side camera 10 captures images of a specified angular range in the right rear of the vehicle, and the left rear side camera 11 captures images of a specified angular range in the left rear of the vehicle. For example, each camera 10, 11 is mounted at a position adjacent to the bottom portion of a pillar A of a front door, or in other words, as illustrated in FIG. 2, is installed at an installation position of a conventional side mirror so as to face the rear of the vehicle. As will be described later, the electronic mirror 200 has a configuration including a right-side mirror 201 that displays an image corresponding to the right rear of the vehicle, and a left-side mirror 202 that displays an image corresponding to the left rear of the vehicle. The video images captured by the right rear side camera 10 are used for the display on the right-side mirror 201, and the video images captured by the left rear side camera 11 are used for the display on the left-side mirror 202.

The cameras 10, 11 are each configured, for example, by a CCD (Charge Coupled Device) camera; however, any camera may be used as long as the camera is able to capture images, and the imaging range of the cameras 10, 11 is also arbitrary. However, it is presumed that the cameras 10, 11 are able to capture a wider range than the display range of the electronic mirror 200. More specifically, as the display form of the electronic mirror 200, there is a form of displaying video images with a display angle equivalent to that of an optical mirror (hereinafter referred to as an optical angle display), a form of displaying video images with a wider display angle (hereinafter referred to as a wide-angle display), and the like. For example, in the optical angle display, the angular range of the display angle is 20 to 30 degrees, and in the wide-angle display, the angular range of the display angle is larger than 30 degrees. The optical angle display and the wide-angle display are performed by partially cutting out the image data captured by the cameras 10, 11. Therefore, in order that a wide-angle display having a wider angular range is possible, the image range W by the cameras 10, 11 illustrated in FIG. 2 is set to be a wider range than the range used for the wide-angle display.

Various switches 20 to 23 are used for operating the electronic mirror 200. The various switches 20 to 23 include a cross switch 20, an LR switch 21, an ON/MENU switch 22, and an electric storage switch 23. Of these switches 20 to 23, for switches 20 to 22 other than the electric storage switch 23, a signal indicating an operating state is inputted to the display control device 100.

The cross switch 20 is a switch for performing position adjustment of the display center of the display image of the electronic mirror 200 in the same manner as adjusting the orientation of a side mirror composed of an optical mirror. As illustrated in FIG. 1, the cross switch 20 has arrow displays directed to each of the up, down, left, and right directions, and a signal corresponding to the pressed direction is inputted to the display control device 100.

For example, a state in which a display is performed by the electronic mirror 200 so that the center of the video image screen captured by the cameras 10, 11 coincides with the center of the electronic mirror 200 is taken to be a reference state. When the cross switch 20 is operated, the position of the center of the display by the electronic mirror 200 is shifted in the operation direction with respect to the display in the reference state. For example, when the position of the up arrow of the cross switch 20 is pressed, the display image on the electronic mirror 200 is adjusted to be the image at a position above the position before the cross switch 20 is switched. More specifically, in the reference state, a specified range centered on a position in the center of the video image screen captured by the cameras 10, 11 is projected on the electronic mirror 200. On the other hand, when the up arrow position of the cross switch 20 is pressed, a specified range centered on a position above the center position of the image screen is projected on the electronic mirror 200.

Moreover, the cross switch 20 is also used for an operation or the like for performing correction of positional deviation of the cameras 10, 11 in a case where the display is performed in a maintenance mode described later. Furthermore, the cross switch 20 is also used for an operation of selecting an arbitrary MENU from a plurality of MENU contents displayed on a MENU display when the ON/MENU switch 22 is pressed to display the MENU.

The LR switch 21 is a switch for selecting which of the right-side mirror 201 and the left-side mirror 202 for performing positional adjustment of the display center by the cross switch 20. The LR switch 21 is configured by a seesaw switch, and is capable of switching between an L position and an R position for selecting either "L" or "R" and a neutral position in which neither is selected. Then, a signal corresponding to the operating state of the LR switch 21 is inputted to the display control device 100. The LR switch 21 is operated before the operation of the cross switch 20, and by operating the cross switch 20 in a state in which the switch is tilted to the desired direction "L" or "R" to be selected, positional adjustment of the display center may be performed for the electronic mirror 200 on the selected side.

The ON/MENU switch 22 corresponds to a setting switch, and is a switch for turning ON/OFF a special display by the electronic mirror 200 and for performing a display of a menu when performing the special display. The special display means a display in a mode other than the optical angle display such as a wide-angle display by the electronic mirror 200, or in other words, a display that cannot be performed by an optical mirror but may be performed by the electronic mirror 200. When the ON/MENU switch 22 is pressed, a menu is displayed on the electronic mirror 200. Based on this, by operating the cross switch 20, arbitrary contents are selected from among the plurality of contents displayed in the menu, and the electronic mirror 200 may be set to perform a display according to the selected contents. While the menu is displayed, there is an ON/OFF setting menu for setting whether to perform the special display by the electronic mirror 200, and based on this, the special display may also be set to be ON or OFF.

The electric storage switch 23 is a switch for storing the cameras 10, 11. The cameras 10, 11 may be switched between the deployed state and the stored state by a storage mechanism such as an electric motor or the like (not illustrated), and the electric storage switch 23 may be used as a switch for driving the storage mechanism. For example, the electric storage switch 23 is configured by a push switch, and in a state of not being pressed, controls the cameras 10, 11 so as to be in the deployed state, and in a state of being pressed, controls the cameras 10, 11 so as to be in the stored state. The signal from the electric storage switch 23 may be supplied to the display control device 100, and the display control device 100 may control the deployment and storage of the cameras 10, 11; however, here, the storage mechanism is able to be directly driven by the operation of the electric storage switch 23.

Of the various switches 20 to 23, the switches other than the ON/MENU switch 22 are existing switches that are used for adjusting the side mirrors configured of optical mirrors. It is desired that the electronic mirror 200 allows various display modes to be set according to the situation; however, it is difficult to newly increase the number of switches just for that purpose. For this reason, setting the display mode may be performed by using existing switches, and the cross switch 20, LR switch 21, and ON/MENU switch 22 may be used for setting the display mode in addition to the functions described above. Note that the setting of this display mode will be described later. Moreover, the deployment and storage of the cameras 10, 11 may be automatically controlled so that, for example, when the IG 2 is turned ON, the cameras 10, 11 are in the deployed state, and when IG 2 is turned OFF, the cameras 10, 11 are in the stored state. In that case, the electric storage switch 23 may be omitted, and configuration may be such that only the ON/MENU switch 22 is provided instead of the existing electric storage switch 23.

The shift position sensor 30 detects the shift state in the vehicle and outputs a detection signal corresponding to the state. By inputting the detection signal of the shift position sensor 30 to the display control device 100, it is possible for the electronic mirror 200 to perform a display according to the shift position.

The door sensor 31 detects the open/closed state of the door of the vehicle and outputs a detection signal corresponding to the detection signal. By inputting the detection signal of the door sensor 31 to the display control device 100, it is possible for the electronic mirror 200 to perform a display corresponding to when the user gets out of the vehicle.

The direction indicator 40 is driven by operating a direction indicator lever or a direction indicator switch (not illustrated) when turning the vehicle to the right or to the left. The operating state of the direction indicator 40 is inputted to the display control device 100, and the electronic mirror 200 may display a right turn display or a left turn display.

Note that the detection signal of the shift position sensor 30 and the door sensor 31 and the signal indicating the operating state of the direction indicator 40 are transmitted to the in-vehicle LAN (abbreviation of Local Area Network) by, for example, CAN (abbreviation of Controller Area Network) communication. Therefore, the detection signal and the operating state of each part may be transmitted to the display control device 100 through the in-vehicle LAN.

The electronic mirror 200 is configured by having a display 200*a* for display, a power supply IC (Integrated Circuit) 200*b*, and a control unit 200*c*; and as described above, the electronic mirror 200 is configured by having a right-side mirror 201 and a left-side mirror 202. Each electronic mirror 200, by projecting a reverse image of the video images captured by the cameras 10, 11 through the display 200*a* functions as a mirror that reflects and displays the state in the rear of the vehicle like an optical mirror.

The display 200*a* is configured by a liquid crystal, an EL display, or the like, and displays video images based on the image data from the control unit 200*c*. The display is performed through the display 200*a*, so a wide-angle display is possible in addition to an optical angle display. Therefore, when the special display is turned ON based on the operation or the like of the ON/MENU switch 22, an optical angle display or a wide-angle display is performed on the display 200*a* depending on the situation.

Moreover, unlike an optical mirror, the electronic mirror 200 does not need to be provided outside the vehicle, and therefore may be mounted inside the vehicle. In a case where the electronic mirror 200 is mounted inside the vehicle, it is possible to prevent the mirror or the front door glass from becoming difficult to see such as when rain adheres to the mirror or the front door glass, unlike a side mirror configured by an optical mirror.

The installation positions of the electronic mirrors 200 are arbitrary, however, preferably the electronic mirrors 200 are arranged at both the left and right ends of the instrument panel inside the vehicle, or on both the left and right A pillars so that for the driver, viewing the electronic mirrors 200 is no different than viewing side mirrors. More preferably, when the electronic mirrors 200 are arranged so as to project from the left and right ends of the instrument panel or from the left and right A pillars, the arrangement can be more similar to that of side mirrors However, when the electronic mirrors 200 are arranged so as to project from the left and right ends of the instrument panel or from the left and right A pillars, the electronic mirrors 200 may interfere with passengers getting in or out of the vehicle. Therefore, it is preferable that the electronic mirrors 200 be capable of being switched between a deployed state and a stored state by a storage mechanism.

The power supply IC 200b is a part that performs control of the power supply of each part of the electronic mirror 200. In addition to the ON/OFF signal of the IG 2 that is inputted to the power supply IC 200b, the power from the power supply 1 is supplied, and a control signal for the power supply is inputted by the display control device 100. Then, when the IG 2 is ON, the power supply IC 200b supplies power to the display 200a and the control unit 200c, and even after the IG 2 is turned OFF, is able to continue to supply power based on the control signal from the display control device 100. More specifically, the display control device 100 continues to be driven by the delay circuit 3 for a specified period even after the IG 2 is turned OFF, so the control signal may be outputted to the power supply IC 200b during the specified period. Therefore, the power supply IC 200b is able to continue to supply power to the display 200a and the control unit 200c for, for example, 2 minutes during the output period of the control signal.

The control unit 200c controls the display on the display 200a based on various signals from the display control device 100. For example, data obtained by cutting out image data captured by the cameras 10, 11 from the display control device 100 in accordance with the display mode, and data related to the mode displayed on the display 200a are inputted to the control unit 200c. The control unit 200c transmits the data to the display 200a, and causes the display 200a to display an image according to the mode.

The external terminal 300 is a maintenance tester or the like used in a maintenance shop such as that of a dealer or the like. In the case of the present embodiment, the input signal from the external terminal 300 is inputted to the display control device 100 via the input terminal 50, and a maintenance mode for performing a maintenance display is set based on the input signal or the like. Note that even though here the input signal from the external terminal 300 is inputted to the display control device 100 via the input terminal 50, it may also be inputted by wireless communication.

As described above, the electronic mirror system is configured so as to include the display control device 100 and the like. Next, a control method for controlling the display of the electronic mirror 200 by the display control device 100 will be described. First, the setting of various display modes performed by the display control device 100 will be described with reference to FIG. 3.

When various display modes are set, the display control device 100 controls the display of the electronic mirror 200 according to the set mode. Examples of the various modes include the modes listed in the chart of FIG. 3.

Each of the modes 1 to 6 in FIG. 3 is a mode set as a rare case different from that during normal driving, and mode 7 is a mode other than a rare mode and is set as a normal case that occurs at a higher frequency. As the mode, a wide-angle display mode, an optical angle display mode, and the like are set. Here, the wide-angle display mode is set by an external factor as a trigger, or a switching operation or the like by a user or an automobile mechanic as a trigger. The optical angle display mode is set as a mode that is set during normal driving. A mode triggered by an external factor is set in order to display the optimum video images in each driving situation according to changes in the external environment such as the shift position, the state of the direction indicator, and the like. The number of this kind of mode increases as the number of various driving situations covered increases. A mode triggered by a switching operation or the like by a user or an automobile maintenance person is set in order to correspond to the user performing a switching operation to request that the wide-angle display be performed. Of modes 1 to 7 described below, modes 3, 5 and 6 are modes triggered by external factors, modes 1, 2 and 4 are modes triggered by a switching operation or the like by a user or an automobile mechanic, and mode 7 corresponds to the mode set during normal driving.

The "1: First maintenance mode" is a mode that is implemented in a case such as when a vehicle is delivered from a vehicle manufacturing factory or the like to a dealer or the like, and an automobile maintenance person uses an external terminal 300 to input an input signal indicating an instruction command. Here, the first maintenance mode is a mode in which an image display is performed in order to correct the roll deviation of the cameras 10, 11, or in other words, to correct the deviation of the cameras 10, 11 in the rotation direction with respect to the imaging center axis. More specifically, in the first maintenance mode, grid lines are displayed in the display image of the electronic mirror 200, and the grid lines may be rotated and moved by operating the cross switch 20 in the left-right direction. For example, when the cross switch 20 is operated in the left direction, the grid lines are rotated in the counterclockwise direction, and when the cross switch 20 is operated in right direction, the grid lines are rotated in the clockwise direction. The image displayed by the electronic mirror 200 is also rotated together with the rotational movement of the grid lines, and it is possible to correct the roll deviation of the cameras 10, 11.

The "2: Second maintenance mode" is a mode that is implemented in a case such as when a vehicle is delivered from a vehicle manufacturing factory or the like to a dealer or the like, and an automobile maintenance person uses an external terminal 300 to input an input signal indicating an instruction command. Here, the second maintenance mode is a mode in which an image display is performed in order to correct deviation of the rear guide lines of the cameras 10, 11, or in other words, to correct the angular deviation of the imaging center axis of the cameras 10, 11 with respect to the reference direction. More specifically, a reference icon such as a scope figure or the like is displayed in the display image of the electronic mirror 200, and the tilt angle of the reference icon may be changed by operating the cross switch 20 in any of the up, down, left, and right directions. For example, when the cross switch 20 is operated in the left direction, the normal vector of the reference icon is tilted in the left direction. The tilt angle of the image displayed by the electronic mirror 200 may also be changed according to the change of the tilt angle of the reference icon, making it possible to correct deviation of the rear guide lines of the cameras 10, 11.

The "3: Reverse display mode" is a mode in which a wide-angle display is performed when the vehicle is driven in reverse to move backward. In this case as well, it is preferable to be able to recognize the state behind the vehicle in a wide range. Therefore, in the reverse display mode, a wide-angle display is performed so that a wider range is displayed.

The "4: Wide field display mode" is a mode triggered by a user operation or the like, and is set in a case where a user wants to drive with caution. For example, this mode corresponds to a case in which it is desired to change lanes. In this case, the user wants to be able to recognize the state behind the vehicle in a wide range, so the wide-angle display is performed so that a wider range is displayed.

The "5: Door open mode" is a mode in which a wide-angle display is performed when getting out of the vehicle. For example, the angular range of the display angle in the optical angle display is 20 to 30 degrees; however, in the door open mode, the wide-angle display is performed in which the angular range is 70 degrees for example, which is larger than the angle in the optical angle display. When getting out of the vehicle, it is preferable to be able to recognize in a wide range the existence of other vehicles approaching from behind the vehicle. Therefore, in the door open mode, a wide-angle display is performed so that a wider range is displayed.

The "6: Left/right turn mode" is a mode in which a wide-angle display is temporarily displayed when turning left or right at an intersection or the like. When turning left or right as well, it is preferable to be able to recognize in a wide range the state behind the vehicle. Therefore, in left/right turn mode, a wide-angle display is performed so that a wider range is displayed.

The "7: Normal driving mode" is a mode that is set in a case where the various modes 1 to 6 described above are not set. In this case, it is presumed that it is not necessary to perform a wide-angle display, so the display of the electronic mirror 200 is set to the optical angle display.

Various modes as described above may be set, and when one of the various modes is set, an optical angle display or a wide-angle display is performed accordingly. Setting these various modes is performed based on the operation of various switches 20 to 22, an input signal from the external terminal 300, the running condition of the vehicle indicated by the shift position sensor 30, the door sensor 31, and the direction indicator 40, and the like. Note that the setting conditions of the various modes are stored in the storage unit 102. Moreover, setting of the various modes is performed separately for each of the right-side mirror 201 and the left-side mirror 202.

Here, to determine which of the modes described above is set, it is conceivable to apply a method of designing a pattern for each of the plurality of modes for transitioning to another mode. However, in that case, in a case a setting a certain mode, it is necessary to design patterns for all of the plurality of modes so that it is known which mode will be transitioned to when which switch operation is performed, which results in a large increase in the number of design steps.

Therefore, in the present embodiment, each mode is prioritized, and in a case where a plurality of modes may be set, a mode having a higher priority is set with priority over other modes. More specifically, "ownership" is set for each display mode. "Ownership" is defined as there being "ownership" in situations such as when only that display mode is set. In a case in which there is "ownership", the display mode is set, and in a case in which there is "no ownership", the display mode is not set. For example, when the mode setting condition that is the condition for entering the display mode is satisfied, it is regarded that there is "ownership". Moreover, in regard to that display mode, when a mode having a higher priority than itself has "ownership" or when the conditions for becoming the display mode are no longer satisfied, "no ownership" is set. Therefore, in a case where there is a display mode that has "ownership", that display mode is set. Note that in a case where a mode with a higher priority than itself has "ownership" and the mode is not set to "no ownership", there may be a plurality of modes having "ownership". In that case, the display mode having "ownership" that has the highest priority may be set.

Furthermore, the state transition of the mode setting state for each display mode may be confirmed as being either "active" or "inactive", and when the mode setting condition of a display mode is satisfied, the display mode becomes "active", and when the mode release condition is satisfied, the display mode becomes "inactive". It is also possible to confirm which display mode is set based on the state transition of the display mode state represented by being "active" or "inactive". In other words, in a case where there is a plurality of "active" display modes, an "active" display mode having a high priority may be set.

Figure 4:
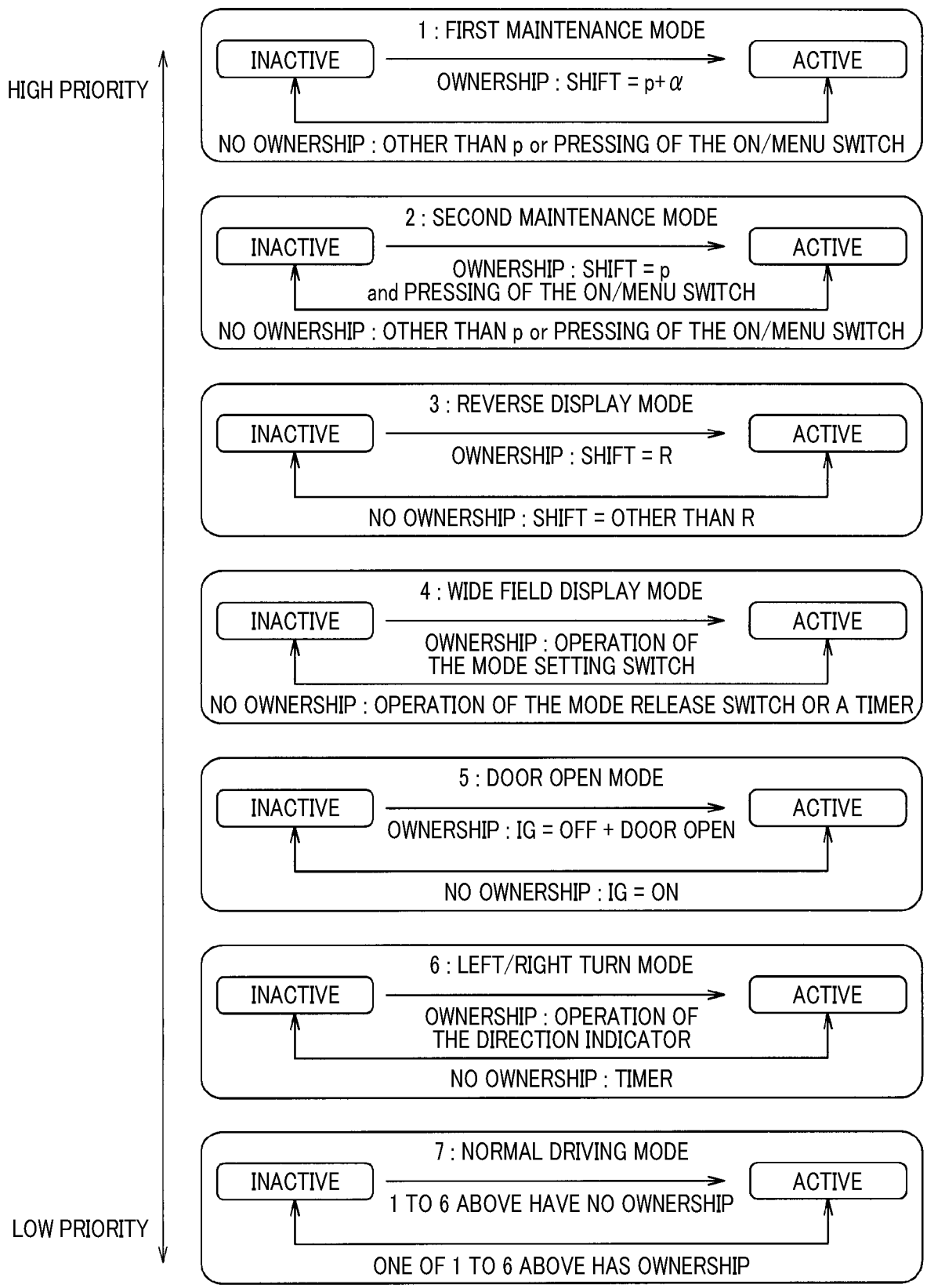
FIG. 4 is a state transition diagram illustrating the relationship between mode setting conditions and mode release conditions, and priorities.

FIG. 4 is a state transition diagram illustrating the relationship between the mode setting condition and the mode release condition of each display mode, and data having a hierarchical structure that gives a level of priority to each display mode. The relationship illustrated in this state transition diagram is stored in the storage unit 102, and various data may be extracted from the storage unit 102.

First, regarding the level of priority, higher priority is given in the order of 1 to 7 for each mode indicated by 1 to 7 in FIG. 3. Therefore, for example, when "1: First maintenance mode" has "ownership", other display modes having a lower priority than that are not set. The same applies in a case where setting the display mode is performed based on the transition states of "active" and "inactive". Even when "1: First maintenance mode" is switched to "active" and the condition for switching to "active" is satisfied for another display mode having a lower priority, "1: First maintenance mode" will be set according to priority.

Moreover, each mode setting condition and mode release condition, or in other words, the switching condition for switching from "inactive" to "active" and the switching condition for switching from "active" to "inactive" are as described below. Note that whether or not each mode setting condition or mode release condition is satisfied is determined based on the operating state of each switch 20 to 22 and the direction indicator 40, the detection result of the shift position sensor 30, and an input signal from the external terminal 300 that are inputted to the display control device 100.

Both "1: First maintenance mode" and "2: Second maintenance mode" are both set as one mode of the maintenance modes, and when a maintenance mode is to be set, the maintenance mode is selectively set from these modes. For example, when a specified mode setting condition is satisfied, first, the first maintenance mode has "ownership" and the first maintenance mode is set. After that, in a case where it is desired to set the second maintenance mode, the ON/MENU switch 22 is pressed. As a result, the first maintenance mode has "no ownership" and the second maintenance mode has "ownership", so the second maintenance mode is set after exiting the first maintenance mode. In this way, one of the first maintenance mode and the second maintenance mode may be selected and set as the maintenance mode.

As an example, when the shift position is "P" and the maintenance mode setting instruction command is inputted to the display control device 100 from the external terminal 300, the shift position has "ownership". Then, the first maintenance mode is switched from "inactive" to "active", and the first maintenance mode is set. Moreover, even in a case where the shift position is "P" and the various switches 20 to 22 are operated in a specified manner, the first maintenance mode is set to have "ownership" and is switched from "inactive" to "active". This makes it possible to set the first maintenance mode without the external terminal 300. Note that in a case where the various switches 20 to 22 are operated in a specified manner, they may be arbitrarily set. For example, a case is presumed in which, as a specified operation, the ON/MENU switch 22 is pressed and held for a long time, and then the left and right arrow positions of the cross switch 20 are alternately pressed a specified number of times within a specified amount of time. Then, when the first maintenance mode is set in this way, grid lines are displayed on the display screen of the electronic mirror 200 as described above, so it becomes possible to correct the roll deviation by operating the cross switch 20 in the left or right direction.

On the other hand, in a case where the shift position is no longer "P" after the first maintenance mode has been set, or when the ON/MENU switch 22 is pressed, the first maintenance mode is set to have "no ownership" and the first maintenance mode Is released. At this time, when the ON/MENU switch 22 is pressed while the shift position is "P", the second maintenance mode is set to have "ownership" and is switched from "inactive" to "active". As a result, the second maintenance mode is set after exiting the first maintenance mode. Then, when the second maintenance mode is set in this way, a reference icon is displayed on the display screen of the electronic mirror 200 as described above, so it becomes possible to correct deviation of the rear guide lines by operating the cross switch 20 in the up or down direction.

Note that in a case where the shift position is no longer "P" after the second maintenance mode has been set, or when the ON/MENU switch 22 is pressed, the second maintenance mode is set to have "no ownership". In this case, for the second maintenance mode, the setting of the second maintenance mode is release from being "active" and is set to be "inactive". At this time, in a case where the ON/MENU switch 22 is pressed while the shift position is "P", it is also possible for the maintenance mode to continue and for the first maintenance mode to be set by exiting from the second maintenance mode and returning to the first maintenance mode.

In this way, the first maintenance mode is set first, and then after that, the second maintenance mode is set. Therefore, first, in the first maintenance mode, for example, correction of the roll deviation of the cameras 10, 11 is performed, and then after that, in the second maintenance mode, for example, correction of the deviation of the rear guide lines of the cameras 10, 11 is performed, and in this way, maintenance may be performed in order. Moreover, switching of the first maintenance mode and the second maintenance mode may be performed in the maintenance mode, so each item of maintenance can be continuously or repeatedly performed without performing an operation for entering the maintenance mode again. For example, transition from the first maintenance mode to the second maintenance mode and transition from the second maintenance mode to the first maintenance mode may be performed by pressing the ON/MENU switch 22, so setting the maintenance mode may be easily performed.

In regard to "3: Reverse display mode", the mode setting condition is that the shift position is "R", or in other words, the reverse position. When the shift position becomes "R", the reverse display mode, together with being set to have "ownership", is switched from "inactive" to "active", and a wide-angle display during reverse driving is performed. On the other hand, when the shift position is other than "R", the reverse display, together with being set to have "no ownership", is switched from "active" to "inactive".

In regard to "4: wide field display mode", when the operating states of the various switches 20 to 22 satisfy specified mode setting conditions, the wide field display mode is set to have "ownership" and is switched from "inactive" to "active". When this mode is set, a wide-angle display for cautious driving is performed. An operating state that satisfies a specified mode setting condition may be arbitrarily set; however, here a case is presumed in which the cross switch 20 is operated while the LR switch 21 is in the neutral position. In addition, when the operating states of the various switches 20 to 22 satisfy a specified mode release condition after the wide field display mode has been set, the mode is set to have "no ownership" and is switched from "active" to "inactive" and the wide field display mode is released. An operating state that satisfies a specified mode release condition may also be arbitrarily set; however, here a case is presumed in which the cross switch 20 is operated while the LR switch 21 is in the neutral position.

Note that in regard to the wide field display mode, it is preferable that the mode is automatically released after use. Therefore, even in a case in which the elapsed time measured by the timer built in the display control device 100 reaches a specified time after the wide field display mode has been set, the mode is switched from "active" to "inactive" and the wide field display mode is released.

In regard to "5: Door open mode", the mode setting condition is that IG 2 is OFF and a door is opened; and when this condition is satisfied, the door open mode is switched from inactive to active, and the wide-angle display when a person is getting out of the vehicle. Moreover, the mode release condition is that the IG 2 is not turned OFF, and when this condition is satisfied, the door open mode is switched from active to inactive. Furthermore, in regard to "5: Door open mode", the condition for having "ownership" is the same as the condition for being "active", and the condition for having "no ownership" is the same as the condition for being "inactive". For example, in the case of "5: Door open mode", when IG" is OFF and a door is opened, the mode always has priority over other modes and is set to have "ownership". On the other hand, when IG 2 is not turned OFF, the user is unlikely to get out of the vehicle and there is little need to display a wide-angle display for getting out, so the setting of "5: Door open mode" is released and is set to have "no ownership".

In regard to "6: Left/right turn mode", when the operating state of the direction indicator 40 satisfies a specified mode setting condition, the left/right turn mode is set to have "ownership" and is switched from inactive" to "active". When this display mode is set, a wide-angle display for turning left or right is performed. Moreover, in a case where the operation of the direction indicator 40 is released after the left/right turn mode has been set and it is no longer necessary to maintain the mode, the mode is automatically released. For example, in a case where after the operation of the direction indicator 40 has been released and the elapsed time measured by the timer built in the display control device 100 reaches a specified time, the left/right turn mode is set to have "no ownership" and is switched from "active" to "inactive". As a result, the left/right turn mode is canceled.

Note that as described above, various mode settings may be performed for each the right-side mirror 201 and the left-side mirror 202. Therefore, for example, when turning right, only the right-side mirror 201 is displayed using a wide-angle display, and when turning left, only the left-side mirror 202 is displayed using a wide-angle display.

In regard to "7: Normal driving mode", the mode is set in a case where none of the modes 1 to 6 described above has "ownership". Moreover, when viewed from the aspect of the transition state, "7: normal driving mode" is set when none of the other various modes 1 to 6 are "active". In other words, if none of the above-mentioned various display modes 1 to 6 is set to have "ownership" or is set to be "active", "7: normal driving mode" is switched from "inactive" to "active". Then, when any one of the 1 to 6 described above is set to have "ownership" or is set to be "active", the normal driving mode is set to be "inactive". As a result, when none of the display modes 1 to 6 described above is set, the normal driving mode is set and the optical angle display is performed.

Note that each of the modes described above has been described using an example of a mode setting condition and a mode release condition. However, the mode setting condition and the mode release condition described here are merely examples, and may be replaced with other conditions or other conditions may be added. For example, in the case of the door open mode, in addition to the IG 2 being OFF and the door being open, the mode setting condition may also include the shift position being "P", or in other words, the parking position, and the vehicle speed being 0. On the other hand, in the case of the door open mode, it is not essential that the IG 2 is OFF, and only the opening of the door may be used as the mode setting condition. In other words, a mode setting condition and a mode release condition are determined for each display mode, and the conditions can be arbitrarily set. Therefore, for example, in the door open mode, when it is determined that the mode setting condition for the door open mode is satisfied, the wide-angle display may be performed, and when it is determined that the mode release condition for the door open mode is satisfied, the wide-angle display may be released.

The mode settings such as described above are performed. More specifically, in the display control device 100, setting the mode is performed by executing a mode setting condition determination process as illustrated in FIG. 5, and a mode setting process as illustrated in FIG. 6.

Figure 5:
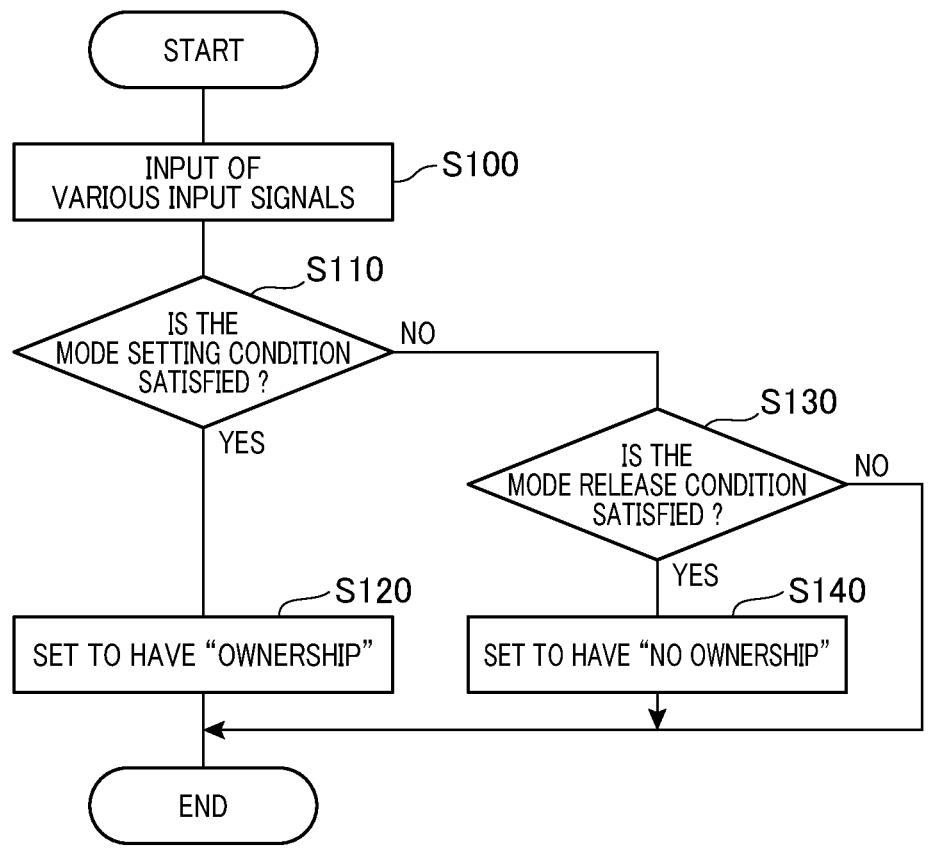
FIG. 5 is a flowchart illustrating details of a mode setting condition determination process.
Figure 6:
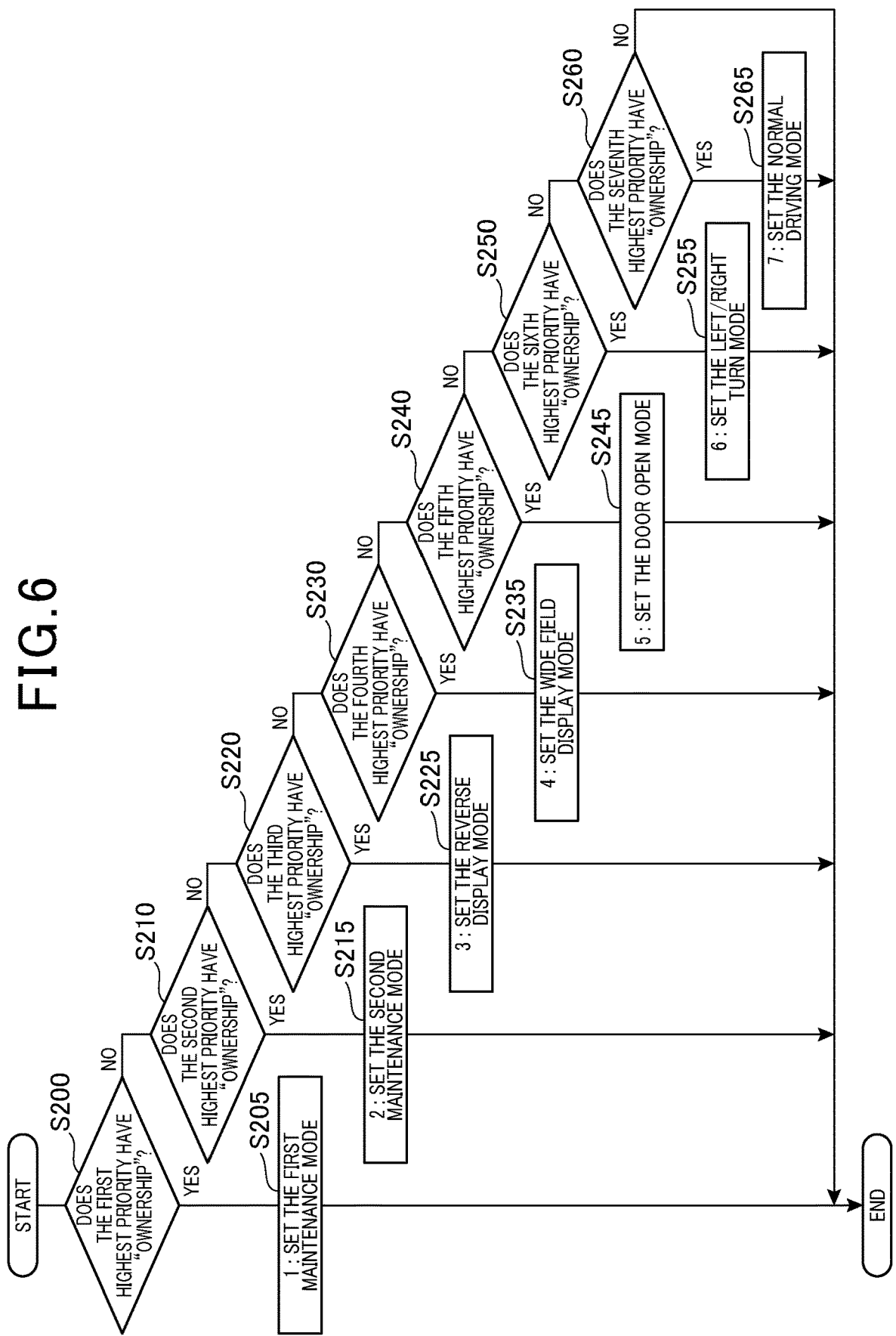
FIG. 6 is a flowchart illustrating the details of the mode setting process.

The display control device 100 executes the mode setting condition determination process illustrated in FIG. 5 for each of the various modes scheduled to be set. This process is executed, for example, at each specified control cycle.

First, in step S100, an input process for inputting various input signals is performed, and in the next step S110, it is determined whether the mode setting condition is satisfied. Since the mode setting conditions are set for each of the display modes described above, the determination in this step is performed by determining whether the conditions are satisfied. For example, in the case of "5: Door open mode", the mode setting condition is that IG 2 is turned OFF.

In a case where an affirmative determination is made, the process proceeds to step S120, "ownership" is set, and the process ends. On the other hand, in a case where a negative determination is made in step S110, the process proceeds to step S130. Then, in step S130, it is determined whether the mode release condition is satisfied. Mode release conditions are set for each of the display modes described above, so the determination in this step is performed by determining whether the conditions are satisfied. For example, in the case of "5: Door open mode", the mode release condition is that IG 2 is not turned OFF.

In a case where an affirmative determination is made, the process proceeds to step S140, "no ownership" is set, and the process ends. On the other hand, in a case where a negative determination is made in step S130, the process ends as is. In this case, the status of having "ownership" and having "no ownership" remains unswitchable, so the current status is maintained.

By executing the mode setting condition determination process as described above, it is determined for each display mode whether a state of "ownership" or "no ownership" is set. Then, based on this result, the mode setting process illustrated in FIG. 6 is executed. This process is also executed, for example, at each specified control cycle.

First, in step S200, it is determined whether "ownership" is set for the display mode having the highest priority, or in other words, "1: First maintenance mode". When an affirmative determination is made, the process proceeds to step S205, the first maintenance mode is set and the process ends, and when a negative determination is made, the process proceeds to step S210.

In step S210, it is determined whether "ownership" is set for the display mode having the second highest priority, in other words, "2: Second maintenance mode". When an affirmative determination is made here, the process proceeds to step S215, the second maintenance mode is set and the process ends, and when a negative determination is made, the process proceeds to step S220.

In step S220, it is determined whether "ownership" is set for the display mode having the third highest priority, in other words, "3: Reverse display mode". When an affirmative determination is made here, the process proceeds to step S225, the reverse display mode is set and the process ends, and when a negative determination is made, the process proceeds to step S230.

In step S230 and subsequent steps, in the same manner as described above, it is determined whether or not "ownership" is set for each display mode having the highest priority from the fourth highest on, and when an affirmative determination is made, that display mode is set. Then, when a negative determination is made, the same process is repeated for the display mode having the next highest priority. By doing so, even in a case where there is a plurality of modes for which "ownership" is set, the display mode having the highest priority may be set.

Note that the determination unit 103 executes steps S110 and S130 that are the determination steps in FIG. 5. Moreover, the process of FIG. 6 is executed by the setting unit 104.

As described above, in the electronic mirror system of the present embodiment, each display mode when the display control device 100 displays on the electronic mirror 200 is prioritized in a hierarchical structure, and setting the mode is performed according to the priority. Therefore, in a case where there are display modes that satisfy the mode setting conditions, the display mode having the highest priority may be selected from those display modes and that mode may be set.

Accordingly, it is not necessary to design an individual pattern for transitioning to the other modes for each of the plurality of modes, and thus it is possible to reduce design man-hours by suppressing an increase in the design man-hours. Moreover, by suppressing the priority design, setting of the display mode may be accurately set, so an increase in management cost may be suppressed, and there is no problem in terms of quality assurance because of not being able to perform mode selection due to unexpected conditions. Therefore, it is possible to make an electronic mirror system capable of reducing design man-hours and improving quality assurance.

Other Embodiments

Although the technique according to present disclosure has been described in accordance with the embodiment above; the technique according to the present disclosure is not limited to that embodiment, and may also include various modifications and modifications within an equivalent range. In addition, various combinations and forms, as well as other combinations and forms that include only one element, or more or less, are also within the scope of the present disclosure.

For example, in the embodiment described above, the display modes 1 to 7 illustrated in FIG. 3 have been described as an example; however, the display modes described here are merely examples of display modes. In other words, other display modes other than modes 1 to 7 that are illustrated may be included, a part of modes 1 to 7 may be excluded, and other display modes may be included while excluding a part of modes 1 to 7.

Figure 7:
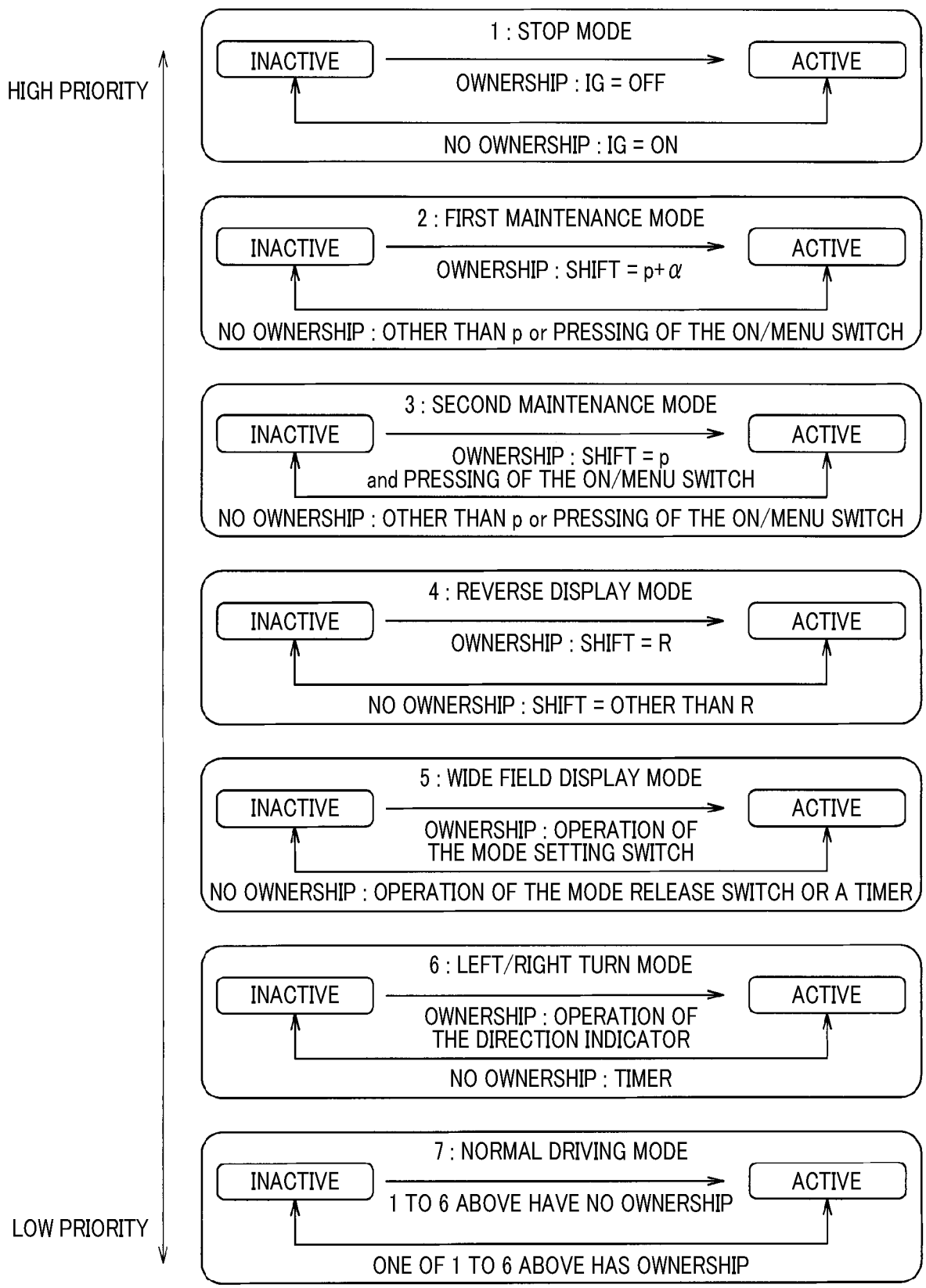
FIG. 7 is a state transition diagram illustrating the relationship between mode setting conditions and mode release conditions, and priorities for various display modes described in other embodiments.

For example, as illustrated in FIG. 7, "1: Stop mode" may be set. The stop mode is a mode for continuing the display by the electronic mirror 200 for a specified period even after the user finishes driving the vehicle. When this mode is set, the display by the electronic mirror 200 is not stopped even when the IG 2 is turned OFF, and continues for a specified period based on the power supply from the delay circuit 3. The form of the display by the electronic mirror 200 is an optical angle display as in the normal driving mode; however, a wide-angle display may also be used. In regard to the stop mode, when the IG 2 is turned OFF as the mode setting condition, the stop mode is set to have "ownership" and the mode is switched from "inactive" to "active". Moreover, when the IG 2 is turned ON as the mode release condition, the stop mode is set to have "no ownership" and the mode is switched from "active" to "inactive". In this way, modes other than the modes illustrated in FIG. 3 may also be included. Note that in the example of FIG. 7, "5: Door open mode" of the first embodiment illustrated in FIG. 3 is eliminated, and "1: Stop mode" is included instead; and in regard to the other modes, a case is illustrated in which part of the order of priority has been changed. This is also just an example, and other display modes may be included or deleted.

Furthermore, the user may also be able to select whether or not to adopt each display mode. For example, when the ON/MENU switch 22 is pressed, a display for selecting whether or not to adopt each display mode is displayed, and the cross switch 20 may be used to select whether or not to adopt a display mode. This makes it possible to select whether to adopt or not adopt, for example, a reverse display mode, a wide field display, or the like.

Moreover, although an example of a mode setting condition and a mode release condition for each display mode has been given, the mode setting condition and the mode release condition may be changed as appropriate. Furthermore, the order of priority of each display mode may be changed as appropriate. In other words, even when a plurality of display modes have been prioritized and configured in a hierarchical structure and mode setting conditions are satisfied for the plurality of display modes, by selecting and setting the display mode having the highest priority, it is possible to obtain the effect explained in the embodiment described above.

Moreover, although the shift position sensor 30, the door sensor 31, and the direction indicator 40 are included as the electronic mirror system, as long a configuration for determining whether or not the mode setting condition is satisfied is provided, not all configurations are required. Of course, other configurations may also be added.

Furthermore, in the embodiment described above, an example is given of an electronic mirror system in which the electronic mirror 200 serves the role of a side mirror of a vehicle, or in other words, is an example of a system that is configured by an electronic side mirror. On the other hand, the above embodiment may also be applied in a case in which the electronic mirror 200 serves as a rearview mirror of a vehicle, or in other words, constitutes an electronic rearview mirror. In that case, of the display modes illustrated in the embodiment described above, those that do not need to be applied to a rearview mirror, such as the left/right turn mode, may be appropriately excluded.

Moreover, in the embodiment described above, the IG 2 is given as an example of a start switch that is a switch that enables the vehicle to start; however, in an electric vehicle or a hybrid vehicle, a push switch or the like is used as a start switch.

CONCLUSION

The present disclosure provides a display control device for an electronic mirror capable of reducing design man-hours and improving quality assurance.

The display control device for electronic mirror according to one aspect of the present disclosure is a display control device that captures video images of the rear of a vehicle by a camera, and using image data from the camera, performs a display on an electronic mirror in a display mode selected from among a plurality of display modes, and includes: an input unit to which input signals are inputted, the input signals including signals indicating operating states of switches used for operating the electronic mirror and used for selecting a display mode from among the plurality of display modes to be displayed by the electronic mirror; a storage unit that together with prioritizing with a priority and storing each of a plurality of display modes in a hierarchical structure, stores mode setting conditions that are conditions for setting each display mode; a determination unit for determining whether or not the mode setting conditions are satisfied for each of the plurality of display modes based on the input signals; and a setting unit that, of the plurality of display modes, sets a display mode having the highest priority from among the display modes for which the mode setting conditions are satisfied, as a display mode to be displayed on the electronic mirror.

In this way, each display mode when the display control device performs a display on the electronic mirror is prioritized in a hierarchical structure, and the mode is set according to the priority. Therefore, in a case where there are display modes that satisfy the mode setting conditions, the display mode having the highest priority may be selected from those display modes and that mode may be set.

Accordingly, it is not necessary to design an individual pattern for transitioning to the other modes for each of the plurality of modes, and thus it is possible to reduce design man-hours by suppressing an increase in the design man-hours. Moreover, by suppressing the priority design, setting of the display mode may be accurately set, so an increase in management cost may be suppressed, and there is no problem in terms of quality assurance because of not being able to perform mode selection due to unexpected conditions. Therefore, it is possible to make an electronic mirror system capable of reducing design man-hours and improving quality assurance.

What is claimed is:
1. A display control device that captures video images of the surroundings of a vehicle by a camera, and using image data from the camera, performs a display on an electronic mirror in a display mode selected from among a plurality of display modes, and comprising:

an input unit to which input signals are inputted, the input signals including signals indicating operating states of switches used for operating the electronic mirror and used for selecting a display mode from among the plurality of display modes to be displayed by the electronic mirror;

a storage unit that together with prioritizing with a priority and storing each of the plurality of display modes in a hierarchical structure, stores mode setting conditions that are conditions for setting each display mode;

a determination unit for determining whether the mode setting conditions are satisfied for each of the plurality of display modes based on the input signals; and a setting unit that, of the plurality of display modes, sets a display mode having the highest priority from among the display modes for which the mode setting conditions are satisfied, as a display mode to be displayed on the electronic mirror, wherein in the electronic mirror, the image data in an imaging range of the camera is partially cut out and displayed, and the plurality of display modes includes a display mode of an optical angle display that displays using a display angle equivalent to an optical mirror, and display modes that perform different special displays such as a wide-angle display that displays using a wider display angle than the optical angle display, an input signal includes a signal indicating a shift position and a signal indicating an instruction command of an external terminal provided outside the vehicle, and one of the plurality of display modes comprises a maintenance mode that performs a maintenance display with a condition including the shift position being in a parking position, and a signal indicating the instruction command being inputted as a mode setting condition.

2. The display control device according to claim 1, wherein the storage unit stores mode release conditions which are conditions for releasing the setting of each of the plurality of display modes;

the determination unit determines whether the mode release condition is satisfied for each of the plurality of display modes based on the input signals; and the setting unit, of the plurality of display modes, releases the display mode for which the mode release condition is satisfied from being the display mode displayed on the electronic mirror.

3. The display control device according to claim 2, wherein the determination unit, for each of the plurality of display modes, sets a display mode for which the mode setting condition is satisfied to have ownership, and sets a display mode for which the mode release condition is satisfied to have no ownership; and the setting unit sets the display mode having the highest priority among the display modes of the plurality of display modes that are set to have ownership to be the display mode that is displayed on the electronic mirror.

4. The display control device according to claim 1, wherein the electronic mirror performs a display on both a right-side mirror and a left-side mirror;

the determination unit determines whether the mode setting conditions are satisfied for each of the right-side mirror and the left-side mirror; and the setting unit, for each of the right-side mirror and the left-side mirror, sets the display mode having the highest priority among the plurality of display modes for which the mode setting condition is satisfied to be the display mode displayed on the electronic mirror.

5. The display control device according to claim 1, wherein the input signal includes an ON/OFF signal from a start switch; and one of the plurality of display modes comprises a stop mode in which a display by the electronic mirror is continued for a specified period even after the start switch is turned OFF, with a condition including that the start switch is turned OFF as the mode setting condition.

6. The display control device according to claim 1, wherein the switches include a cross switch used for adjusting the position of a display center of a display image of the electronic mirror, and a setting switch for performing a menu display when performing the special display;

the maintenance mode includes a first maintenance mode and a second maintenance mode;

the first maintenance mode performs an image display for correcting roll deviation that is deviation in a rotation direction with respect to the center axis of imaging by the camera, and during the first maintenance mode, correction of the roll deviation is performed based on operation of the cross switch;

the second maintenance mode performs an image display for correcting angle deviation in a reference direction of the center axis of imaging by the camera, and during the second maintenance mode, correction of the angle deviation is performed based on operation of the cross switch; and during the maintenance mode, switching between the first maintenance mode and the second maintenance mode is performed based on the pressing of the setting switch.

7. The display control device according to claim 1, wherein the input signal includes a signal indicating a shift position; and one of the plurality of display modes comprises a reverse display mode that performs the wide-angle display with a condition that includes a signal being inputted that indicates that the shift position is a reverse position as the mode setting condition.

8. The display control device according to claim 1, wherein the switches include a cross switch used for position adjustment of a display center of a display image of the electronic mirror; and one of the plurality of display modes comprises a wide field display mode that performs the wide-angle display with a condition that includes the cross switch being operated as the mode setting condition.

9. The display control device according to claim 1, wherein one of the plurality of display modes comprises a door open mode that performs the wide-angle display when a door open mode setting condition is satisfied based on the input signal.

10. The display control device according to claim 1, wherein the input signal includes a signal that indicates an operating state of a direction indicator; and one of the plurality of display modes comprises a left/right turn mode that performs the wide-angle display with a condition that includes the direction indicator being operated as the mode setting condition.

11. The display control device according to claim 1, wherein
a normal driving mode performs the optical angle display with none of the mode setting conditions of the display modes for the special display being satisfied as the mode setting condition.

12. An electronic mirror system, comprising:
an electronic mirror;
a display control device that captures video images of the surroundings of a vehicle by a camera, and using image data from the camera, performs a display on an electronic mirror in a display mode selected from among a plurality of display modes, comprising:
an input unit to which input signals are inputted, the input signals including signals indicating operating states of switches used for operating the electronic mirror and used for selecting a display mode from among the plurality of display modes to be displayed by the electronic mirror;
a storage unit that together with prioritizing with a priority and storing each of a—the plurality of display modes in a hierarchical structure, stores mode setting conditions that are conditions for setting each display mode;
a determination unit for determining whether the mode setting conditions are satisfied for each of the plurality of display modes based on the input signals; and
a setting unit that, of the plurality of display modes, sets a display mode having the highest priority from among the display modes for which the mode setting conditions are satisfied, as a display mode to be displayed on the electronic mirror,
wherein
the display control device causes the electronic mirror to perform a display according to the display mode set by the display control device, wherein
in the electronic mirror, the image data in an imaging range of the camera is partially cut out and displayed, and the plurality of display modes includes a display mode of an optical angle display that displays using a display angle equivalent to an optical mirror, and display modes that perform different special displays such as a wide-angle display that displays using a wider display angle than the optical angle display,
an input signal includes a signal indicating a shift position and a signal indicating an instruction command of an external terminal provided outside the vehicle, and
one of the plurality of display modes comprises a maintenance mode that performs a maintenance display with a condition including the shift position being in a parking position, and a signal indicating the instruction command being inputted as a mode setting condition.

* * * * *